United States Patent [19]

Arnush et al.

[11] 4,208,582
[45] Jun. 17, 1980

[54] ISOTOPE SEPARATION APPARATUS

[75] Inventors: Donald Arnush, Rancho Palos Verdes; Kenneth R. MacKenzie, Pacific Palisades; Ralph F. Wuerker, Palos Verdes Estates, all of Calif.

[73] Assignee: TRW Inc., Redondo Beach, Calif.

[21] Appl. No.: 858,329

[22] Filed: Dec. 5, 1977

[51] Int. Cl.² .................... B01D 59/44; H01J 39/34
[52] U.S. Cl. ............................ 250/291; 250/283; 250/290
[58] Field of Search ............. 250/290, 291, 292, 293, 250/281, 272, 288, 432, 433, 283; 313/231; 315/111.4

[56] References Cited

U.S. PATENT DOCUMENTS

| | | | |
|---|---|---|---|
| 2,627,034 | 1/1953 | Washburn et al. | 250/291 |
| 2,958,774 | 11/1960 | McNarry et al. | 250/291 |
| 3,086,110 | 4/1963 | Klopfer | 250/291 |
| 3,363,138 | 1/1968 | Gruber et al. | 315/111.4 |

*Primary Examiner*—Bruce C. Anderson
*Attorney, Agent, or Firm*—John J. Connors; Benjamin DeWitt

[57] ABSTRACT

Isotope separation apparatus consisting of a plurality of cells disposed adjacent to each other in an evacuated container. A common magnetic field is established extending through all of the cells. A source of energetic electrons at one end of the container generates electrons which pass through the cells along the magnetic field lines. Each cell includes an array of collector plates arranged in parallel or in tandem within a common magnetic field. Sets of collector plates are disposed adjacent to each other in each cell. Means are provided for differentially energizing ions of a desired isotope by applying energy at the cyclotron resonant frequency of the desired isotope. As a result, the energized desired ions are preferentially collected by the collector plates.

19 Claims, 3 Drawing Figures

ISOTOPE SEPARATION APPARATUS

CROSS REFERENCES TO RELATED APPLICATIONS

The present invention relates to improvements in isotope separation apparatus of the type which implements the process disclosed and claimed in the copending application of John M. Dawson filed on Jan. 24, 1977, Ser. No. 761,939, which is a continuation of a prior application, Ser. No. 562,993, filed on Mar. 27, 1975. The process disclosed in said prior application will be referred to hereinafter as the Dawson Separation Process. The present application is also related to a prior copending application of Reiner Stenzel filed on June 9, 1976, Ser. No. 694,492 U.S. Pat. No. 4,093,856.

BACKGROUND OF THE INVENTION

The invention relates generally to the separation of isotopes and particularly relates to isotope separation apparatus constructed and arranged for a substantial yield of isotopically enriched material on a production quantity basis.

In order to separate isotopes on a commerical scale, it is desirable to obtain a relatively large output with a minimum expenditure of energy. It is therefore necessary to make maximum use of the electric and magnetic fields which are required for the separation in accordance with the Dawson Separation Process.

This may most conveniently be accomplished by a multiple collector arrangement. In other words, by providing a plurality of cells or units arranged parallel or in tandem to each other it is feasible to utilize the same magnetic field for all cells. Successive separation cells may be arranged to operate in a serial manner thereby to provide a relatively large throughput in an economical manner.

It is accordingly an object of the present invention to provide an isotope separation apparatus featuring a multiple extraction separation scheme.

A further object of the present invention is to provide an apparatus of the type discussed having a high efficiency and a greater output than the machines disclosed, for example, in the copending applications above referred to.

Another object of the present invention is to provide a replicative isotope separation apparatus which utilizes common magnetic and electric fields.

SUMMARY OF THE INVENTION

In accordance with the present invention, the apparatus comprises an evacuated container, means for generating a magnetic field extending along a predetermined axis through the container, and means, including an electric field extending along the longitudinal axis, for generating and accelerating electrons throughout the container.

A plurality of substantially identical cells are tandemly disposed side by side throughout the chamber. Each of the cells includes a plurality of collector plates extending parallel to and spaced from each other and along the axis throughout the depth of the container. Sets of the collectors may be disposed adjacent to each other in each cell. Means are provided for feeding the gas to be isotopically separated into each cell. The gas becomes ionized by the energetic electrons passing along the longitudinal axis. Finally, means are provided for differentially energizing the ions of a desired isotope by applying an alternating electric field at their resonant cyclotron frequency. As a result, the ions of the energized desired isotope move along helical lines and are preferentially collected by the collector plates.

DESCRIPTION OF THE PREFERRED EMBODIMENT

Figure 1:
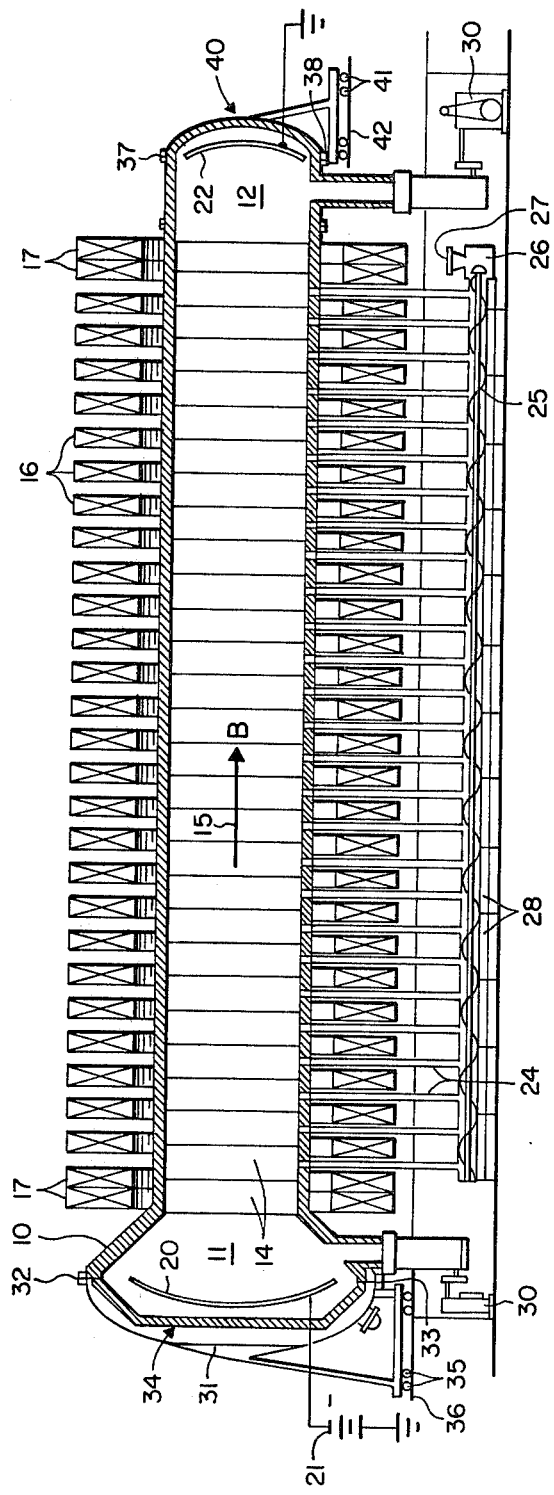
FIG. 1 is a schematic side elevational view, parts being broken away, of an isotope separation apparatus in accordance with our invention.

Referring now to the drawings and particularly to FIG. 1 there is illustrated an isotope separation apparatus which includes an evacuated container 10 having a left hand end portion 11 and a right hand end portion 12. The container houses a plurality of cells 14 which will be described in detail hereinafter in connection with FIGS. 2 and 3. Suffice it to say at this point that each cell contains equipment for separating isotopes of an element from each other, or at least enriching a desired isotope, in a parallel fashion. Each of the cells function substantially independently of the others except that they all share in common a single magnetic field and a single source of input material.

Magnetic field B extends in a longitudinal direction as shown by arrow 15. The magnetic field is generated by a plurality of magnetic coils 16 which surround the container 10. Preferably we provide one coil 16 for each cell 14. Preferably, but not necessarily, all the coils 16 consist of superconductive material. Additional coils 17 at each end are positioned closer together to provide the magnetic field at the edges of the outermost cells 14. However, it will be understood that in the end portions 11 and 12 there will be a region of a reduced magnetic field, preferably about one-fourth the strength of the field prevailing elsewhere.

A cathode 20 is mounted in the end portion 11 and may be curved as shown to orthagonally intercept the magnetic field lines. That is, when the cathode is located in the diverging-field region it desirably is curved sufficiently so that all field lines pass through the cathode substantially normal to the cathode surface. The cathode 20 preferably consists of an array of thermonic filaments separated by approximately the ion cyclotron radius; however, it will be understood that other types of cathodes may be used. The cathode is maintained at a suitable negative potential by a voltage source 21. Preferably the cathode has a potential of between −50 and −100 volts so that electrons emitted from it have a sufficient kinetic energy to efficiently ionize neutral gas molecules with which the electrons collide.

An anode 22 is disposed in the other end portion 12 and may be grounded, as shown, to establish an electric field gradient along the entire container 10 in the direction of the magnetic field 15. By this arrangement, electrons emitted from cathode 20 will pass from one end portion 11 to the other end portion 12. It will be understood, however, that other arrangements of the anode may be used such as the sectioned anode disclosed and claimed in the copending Stenzel application above referred to.

A suitable gas which includes atoms of an element having at least two isotopes is introduced into each of the cells by a tube 24. By way of example, to separate uranium 238 ($U^{238}$) from uranium 235 ($U^{235}$), uranium tetrachloride ($UCl_4$) may be used. It is a solid at room temperature, but melts at a temperature of about 800° C. (centigrade). The powder of $UCl_4$ may be heated to a temperature of about 400° C. to provide a vapor pressure corresponding to $10^{12}$ particles per cubic centimeter. The temperature may be adjusted to provide any desired plasma density in the range from $10^8$ to $10^{13}$ particles per $cm^3$.

The uranium tetrachloride powder may be conveniently fed into the apparatus by a screw 25 rotated by a suitable motor, generally indicated at 26. The input material feed system preferably includes a hopper 27 which may be closed to maintain vacuum pressure in container 10. By rotating the screw 25, the uranium tetrachloride powder is transported past the bottom end of each of the several tubes 24, each communicating with one of the individual cells 14. A heater schematically indicated at 28 extends below the screw 25 to heat the $UCl_4$ powder to the desired temperature.

Accordingly, uranium tetrachloride gas is evolved and fed through the tubes 24 into the cells 14. This gas or the corresponding gaseous molecules of uranium tetrachloride, as the case may be, are ionized by the collision with primary electrons from cathode 20 thereby generating a substantially neutral plasma which includes uranium ions and uranium tetrachloride ions.

The container 10 may be evacuated by a pair of vacuum pumps shown schematically at 30 at either end of the structure, and end portion 11 may be provided with a heat shield shown at 31. Preferably, end portion 11 is constructed so that it may be separated from container 10 at the seals 32 and 33. That is, when it is desired to open container 10, the end bell 34 may be moved toward the left by means of the rollers 35, moving over a platform 36.

Similarly, the end portion 12 may be opened by means of the seals 37 and 38, with the end structure 40 moving toward the right by the rollers 41 riding on a platform 42. In this manner, access may be had to the container 10 for installation, removal, or repair of individual cells 14.

Figure 2:
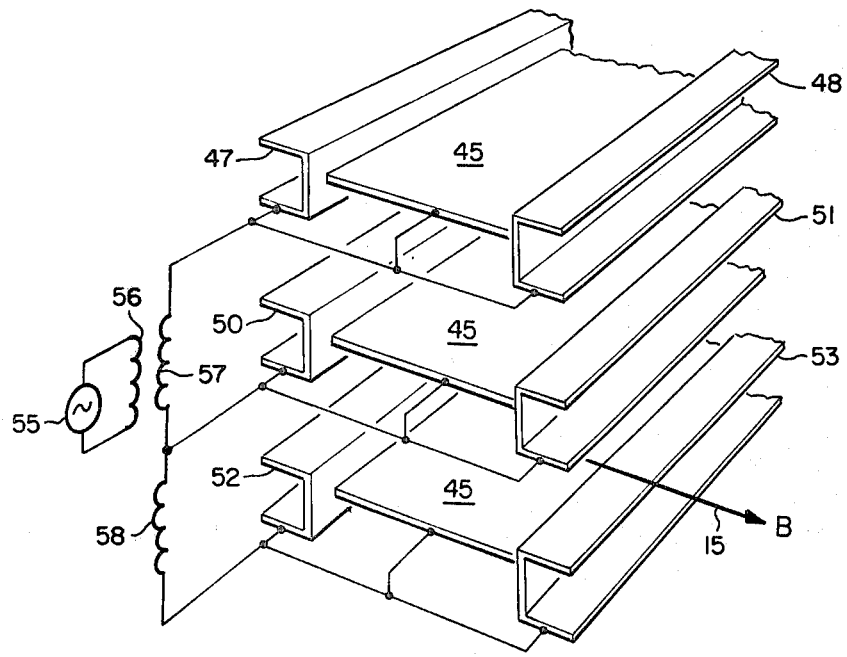
FIG. 2 is a view in perspective on enlarged scale of one of the cells of the apparatus illustrated in FIG. 1.
Figure 3:
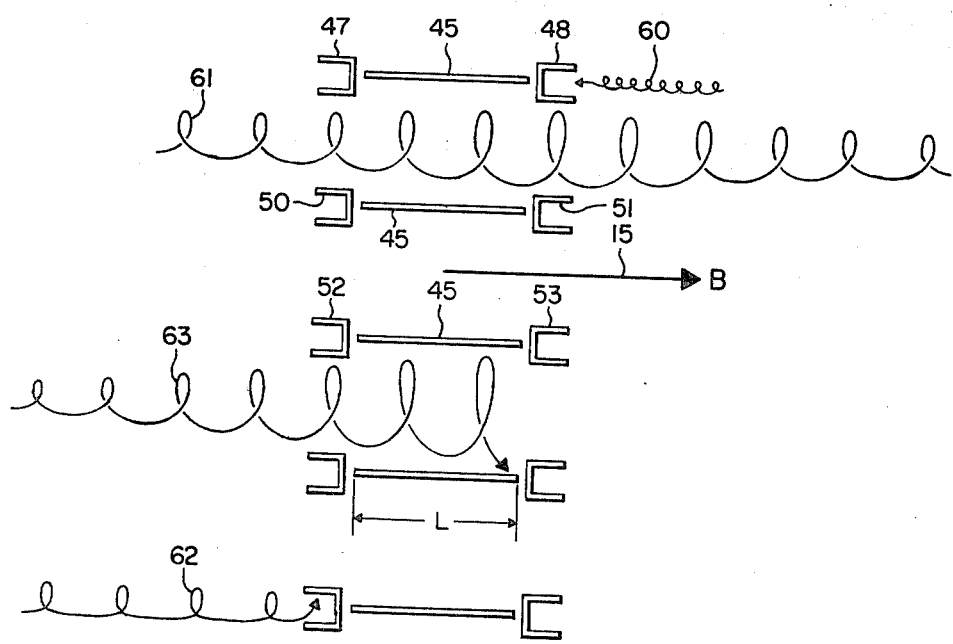
FIG. 3 is a schematic diagram of one of the cells illustrating the separate and selective collection of energized ions and other less energetic ions.

The structural arrangement of the collector array located within one cell 14, and the operation of the apparatus of the invention will now be explained by reference to FIGS. 2 and 3. Each of the cells 14 contains a collector array comprising a plurality of plates 45 which may be termed collector plates because they serve the purpose of preferentially collecting the desired isotope. As shown in FIGS. 2 and 3, the plates 45 are spaced from each other in a direction normal to that of the magnetic field designated by arrow 15 and extend transversely of the container 10. The distance between adjacent plates preferably is equal to or greater than the ion cyclotron diameter. The interspacing of adjacent cells, in the magnetic field direction, preferably is about equal to the product of the ion's axial-drift velocity, $V_d$, multiplied by the time required to pump an ion to an orbit diameter substantially equal to the distance between adjacent plates 45. Each of the plates 45 has a length normal to the magnetic field 15 which is arbitrary and depends on the size of the plasma that one wishes to generate. The dimension L of each of the cells in the direction of the magnetic field will depend on the ion drift velocity $V_d$ in the axial direction. Dimension L preferably is at least equal to $V_d$ multiplied by the rotation period of an ion in the magnetic field.

Adjacent the two long edges of each plate 45 there is provided a pair of excitor plates 47, 48 and 50, 51. While these plates are shown as being generally U-shape, it will be understood that they could be flat plates normal to the surface of the collector plates 45 and 46.

In order to differentially energize the desired ions, such as $U^{235+}$ ions, by pumping them at the cyclotron frequency in the manner disclosed and claimed in the Dawson application above referred to, it is necessary to generate throughout the plasma an electric field alternating at the particular cyclotron frequency or a harmonic thereof. This may be effected in various ways, for example, in the manner disclosed in the Stenzel application above referred to. Preferably, however, the electric cyclotron frequency field is generated by applying a voltage at the cyclotron frequency to plates 47, 48; 50, 51 and 52, 53 in a manner which will now be explained.

As shown in FIG. 2, we provide an alternating voltage source 55 of the required cyclotron frequency for the isotope to be separated or a harmonic of that frequency. Connected across the voltage source 55 is the primary 56 of a transformer having its secondary 57 connected between the plates 47, 50. The electric arrangement is such that another secondary winding 58 will generate the opposite voltage to that generated by the secondary winding 57. Secondary winding 58 is connected between plates 50 and 52. Hence, an electric field, $E \sin \omega_c t$ is generated between the plates 47, 50, while an oppositely phased field $-E \sin \omega_c t$ is generated between the plates 50 and 52. The same positive field is generated between the plates 48 and 51 and the same negative field between plates 51 and 53. Furthermore, as shown, excitor plates 47, 48 are connected to collector plates 45 and so on. This is effected by electrically interconnecting plates 47, 48; 50, 51; and 52, 53 as shown.

It will be understood that a set of collector plates 45 and excitor plates such as 47, 48 and 50 to 53 may be disposed side by side in each of the cells 14. Thus, by way of example, for a specific arrangement where E corresponds to $\frac{1}{2}$ volt per centimeter, the distance between the two open legs of any of the U shape plates like 47 may be one centimeter while the distance between adjacent collector plates 45 should be about three centimeters. The length L may be 10 centimeters.

The operation of the apparatus will now be explained in connection with FIGS. 2 and 3. In response to the applied electric cyclotron field and the magnetic field both the desired and undesired isotopes will be energized. That is, they will follow a spiral or helical path which may be of increasing diameter. However, since the resonant cyclotron frequency for the undesired isotope is different from the frequency of the applied voltage, ions of the undesired isotope gradually fall out of phase with the driving electric field, and therefore, are not continuously pumped to orbits of increasing diameter.

Specifically, the undesired isotope $U^{238}$ will tend to have a path as shown at 61 or 62. The ion moving in the direction shown at 60 will be collected by the excitor plates 48. An ion such as shown at 61 will travel through the interspace between adjacent collector plates and will not be collected. Similarly, the ion shown at 62 will be collected again by one of the excitor plates. In contrast, the helical path of a desired $U^{235}$ ion is as shown at 63. Because the frequency of the applied electric field is tuned to coincide with the natural cyclotron frequency of $U^{235}$ ions, these ions are continuously pumped, by absorption of kinetic energy from the electric field, and follow helical paths of continuously increasing diameter. As a result, the ion eventually is collected by one of the collector plates 45.

The undesired ions are generally not collected by the collector plates 45 because their helical paths do not increase to a large enough radius to impinge on a collector plate 45 without being trapped by one of the excitor plates 48, 51 and 53. The undesired ions such as ions 60 and 62 will either be collected by one of the excitor plates or else they will pass between a pair of adjacent collector plates 45.

It will be understood that the direction of movement of any given ion will depend on random and fortuitous collision with an energetic electron which ionizes it. Hence the uranium ions move along the magnetic field lines in both directions.

It will be understood, of course, that the collector plates 45 will also collect some of the undesired ions and that some of the desired ions may be collected by the excitor plates such as 47, 48. However, by a suitable design of the apparatus it is feasible to differentially collect the desired isotope to an extent depending on the use to be made of the enriched material so collected.

From time to time container 10 may be opened at either or both ends in the manner previously explained. This permits removal of the cells 14 and the collector plates 45. Also, the excitor plates 47, 48 and 50 to 53 may be removed. Subsequently, the enriched uranium may be recovered from the collector plates 45, for example by heating them in a vacuum. Alternatively, the enriched uranium isotope may be removed from the collector plates by dissolving the uranium by chemical reaction or by heating the plates in the presence of a gas which reacts therewith. It may also be desirable to remove the undesired isotopes from the excitor plates so that the separation may be carried out with clean collector and excitor plates.

Each of the cells 14 is supplied with its own gas which is then transformed into a plasma by impact with energetic electrons. On the other hand, the cells share a common magnetic field as well as a common supply of electrons. There may also be a common electric field extending through the entire structure. Hence the cells may be said to operate in parallel.

On the other hand, within each cell due to the plurality of collector plates and excitor plates, there exists basically a series separation scheme. This will be evident because the same plasma is successively separated in successive sets of plates disposed adjacent to each other.

It will, of course, be understood that the apparatus may be used with other gases containing uranium or other elements to be separated. Also, the dimensions given herein only apply to a particular example and will be different for different operating conditions.

There has thus been disclosed an isotope separation apparatus which is characterized in having multiple collectors operating in parallel or in tandem or both. The apparatus consists of a plurality of cells, each having its own supply of gas which is transformed into a plasma by impact with energetic electrons. Each cell comprises a plurality of collector plates. The dimensions and operating conditions are such that the collector plates preferentially collect the desired isotopes while the excitor plates preferentially collect the undesired isotopes. Preferably, the excitor plates are supplied with a voltage tuned to the cyclotron frequency of the desired isotope or a harmonic thereof. It will be understood, however, that an electric field at the cyclotron frequency of a desired isotope may be generated and applied to the plasma by any of various electrical arrangements.

What is claimed is:

1. In an isotope separation apparatus:
   (a) an elongated evacuated container;
   (b) means for generating a magnetic field extending substantially parallel to the longitudinal axis through said container;
   (c) means including an electrical field extending along said longitudinal axis for generating and accelerating electrons longitudinally of said container;
   (d) a plurality of substantially identical cells disposed respectively at longitudinally-spaced positions within said container;
   (e) each of said cells including a plurality of collector surfaces extending parallel to each other and parallel to said axis;
   (f) means for feeding a gas to be separated into each of said cells so that said gas becomes ionized by the electrons passing along said longitudinal axis to form a substantially neutral plasma having a density of at least $1 \times 10^8$ particles per cubic centimeter throughout substantially the entire space encompassed by said magnetic field; and
   (g) means applying an alternating electric field for exciting the ions of a desired isotope at their resonant cyclotron frequency or a harmonic thereof, whereby the energized desired ions are preferentially collected by said collector surfaces.

2. In an isotope separation apparatus, the combination of:
   (a) an elongated evacuated container;
   (b) means for providing a substantially uniform magnetic field extending substantially parallel to the longitudinal axis of said container;
   (c) means located at one end of said container for producing and accelerating electrons longitudinally of said container;
   (d) a plurality of feedstock injection devices spaced apart along said container for injecting vapor of a substance that includes atoms of an element having at least two isotopes to thereby form a plasma within said container with said plasma including ions containing atoms of said element and having a density of at least $1 \times 10^8$ particles per cubic centimeter throughout substantially the entire space encompassed by said magnetic field within said container;
   (e) means applying an alternating electric field to said plasma with the electric-field vector substantially normal to said axis for preferentially imparting kinetic energy to ions which contain a selected one of said isotopes, with said electric field having a frequency substantially corresponding to the resonant cyclotron frequency of the selected isotope or a harmonic of such frequency; and
   (f) a plurality of collectors spaced apart within said plasma for preferentially collecting ions having kinetic energies exceeding a predetermined energy threshold and thereby enabling physical extraction of a substance which is enriched in said selected one of said isotopes.

3. The apparatus of claim 2 in which said means for generating and accelerating electrons comprises a large area cathode extending substantially perpendicular to the magnetic field lines and having an area substantially corresponding to the cross-sectional area of the magnetic field within said container.

4. An apparatus in accordance with claim 2 wherein high energy electrons successively traverse a plurality of said collectors.

5. An apparatus in accordance with claim 2 wherein each of said feedstock injection devices comprises means for injecting a vapor of a uranium salt which is vaporizable at an elevated temperature to provide an ionizable gas having a vapor density within the range from about $10^8$ to $10^{13}$ particles per cubic centimeter.

6. An apparatus in accordance with claim 2 in which said plurality of collectors comprises a plurality of cells arranged in spaced apart relation along the length of said container and with each of said cells comprising a plurality of collector plates disposed substantially parallel to the magnetic field lines and spaced apart transversely of said container.

7. In an apparatus for isotope enrichment by ion cyclotron resonance in which a plasma, including ions that comprise atoms of an element having at least two isotopes, is contained within a steady magnetic field having a longitudinal axis and is subjected to an alternating electric field perpendicular to said axis and of a frequency corresponding to the orbital frequency of selected-iosotope ions, or a harmonic of said orbital frequency, for preferentially accelerating the selected-isotope ions so that such ions travel in expanded helical orbits within said plasma with kinetic energies substantially exceeding the energy of ions containing other isotopes of the same element, the improvement comprising:

(a) means for introducing a non-ionized gas which includes atoms of said element in a manner such that said gas diffuses throughout a region within said magnetic field having cross-sectional dimensions at least several times larger than the diameter of the expanded orbit of a selected-isotope ion in said plasma; and (b) ionization means, including means for providing electrons having sufficient kinetic energy for collision ionization of molecules of said gas, for ionizing such molecules in situ throughout said region and producing plasma having a density of at least $1 \times 10^8$ particles per cubic centimeter flowing longitudinally of said magnetic field throughout a plasma pathway having cross-sectional dimensions at least several times larger than the diameter of the expanded orbit of a selected-isotopeion in said plasma; and (c) a plurality of ion-collecting devices, located respectively at a plurality of spaced positions within said pathway, for preferentially collecting selected-isotope ions and thereby producing a product which has an increased abundance of selected-isotope atoms of said element.

8. An apparatus in accordance with claim 7 in which each of said ion-collecting devices comprises:

at least two collector plates spaced apart in a direction normal to said axis with the planar surfaces of said plates aligned substantially parallel to said axis for preferentially collecting the selected-isotope ions; and a guard plate, disposed adjacent at least one edge of each of said collector plates and extending in a direction normal to said axis, for intercepting those other-isotope ions which have (i) orbits diameters smaller than the interspacing between adjacent collector plates, and (ii) axes of gyration such that their helical paths intersect said guard plate so that other-isotope ions are either intercepted by said guard plate or pass through the interspace between adjacent collector plates.

9. An apparatus in accordance with claim 8 wherein the width, in the axial direction, of each of said collector plates is at least equal to the product of the axial drift velocity of ions flowing along said pathway multiplied by the period of the cyclotron frequency gyration of a selected-isotope ion in the magnetic field.

10. An apparatus in accordance with claim 7 in which said ion-collecting devices are spaced apart in the plasma pathway to form an array which extends substantially normal to the longitudinal axis.

11. An apparatus in accordance with claim 7 in which first and second groups of said ion-collecting devices extend across said pathway at first and second longitudinally-spaced positions.

12. An apparatus in accordance with claim 7 wherein the plasma includes selected-isotope ions which comprise atoms of Uranium 235and other-isotope ions which comprise atoms of Uranium 238.

13. In an apparatus for isotope enrichment by ion cyclotron resonance in which a plasma, including ions that comprise atoms of an element having at least two isotopes, is contained within a steady magnetic field having a longitudinal axis and is subjected to an alternating electric field perpendicular to said axis and of a frequency corresponding to the orbital frequency of selected-isotope ions, or a harmonic of said orbital frequency, for preferentially accelerating the selected-isotope ions so that such ions travel in expanded helical orbits within said plasma and with kinetic energies substantially exceeding the energy of ions containing other isotopes of the same element, the improvement comprising:

(a) means for producing a plasma having a density of at least $1 \times 10^8$ particles per cubic centimeter flowing longitudinally of said magnetic field throughout a plasma pathway having dimensions, normal to said axis, at least several times larger than the expanded orbit of gyration of a selected-isotope Ion in said plasma; and (b) a plurality of ion-collecting devices, located respectively at a plurality of spaced positions within said pathway, for preferentially collecting selected-isotope ions and thereby producing a product which has an increased abundance of selected-isotope atoms of said element.

14. An apparatus in accordance with claim 13 in which each of said ion-collecting devices comprises:

at least two collector plates spaced apart in a direction normal to said axis with the planar surfaces of said plates aligned substantially parallel to said axis for preferentially collecting the selected-isotope ions, and a guard plate, disposed adjacent at least one edge of each of said collector plates and extending in a direction normal to said axis, for inte rcepting those other-isotope ions which have (i) orbits diameters smaller than the interspacing between adjacent collector plates and (ii) axes of gyration such that their helical paths intersect said guard plate so that a majority of the other-isotope ions are either intercepted by said guard plate or pass through the interspace between adjacent collector plates.

15. An apparatus in accordance with claim 13 in which each of said ion-collecting devices comprises:

a plurality of collector plates spaced apart in a direction normal to said axis with the planar surfaces of said plates aligned substantially parallel to said axis for preferentially collecting the selected-isotope ions, and means disposed adjacent at least one edge of each of said collector plates for intercepting and collecting other-isotope ions so that other-isotope ions travelling in helical orbits along said pathway preferentially are either intercepted by said means or pass through the interspace between adjacent collector plates and an isotopically enriched product is collected by the collector plates.

16. An apparatus in accordance with claim 15 wherein the width, in the axial direction, of each of said collector plates is at least equal to the product of the axial drift velocity of ions flowing along said pathway, multiplied by the period of the cyclotron frequency gyration of a selected-isotope ion in the magnetic field.

17. An apparatus in accordance with claim 15 wherein the inter-spacing between said collector plates in the direction normal to said axis is less than the diameter of the expanded orbit of a selected-isotope ion in said plasma.

18. An apparatus in accordance with claim 15 wherein a plurality of said ion-collecting devices are disposed respectively at a plurality of longitudinally-spaced positions within the plasma pathway with the distance between adjacent devices being substantially equal to the product of the average longitudinal drift velocity of selected-isotope ions multiplied by the time required to accelerate a selected-isotope ion to a velocity corresponding to an orbit diameter larger than the normal-to-the axis distance between a pair of adjacent collector plates.

19. An apparatus in accordance with claim 13 in which a first ion-collection cell comprises a first group of said ion-collecting devices, a second ion-collection cell comprises a second group of said ion-collecting devices, said first and second cells are disposed respectively at first and second longitudinally-spaced positions along the plasma pathway, and the ion-collecting devices of each group are spaced apart in a direction substantially normal to the longitudinal axis.

* * * * *